US011799352B2

(12) United States Patent
Hirachi et al.

(10) Patent No.: US 11,799,352 B2
(45) Date of Patent: Oct. 24, 2023

(54) MOTOR DEVICE WITH GROUND BUS BAR

(71) Applicant: SHINANO KENSHI CO., LTD., Ueda (JP)

(72) Inventors: Eiji Hirachi, Nagano (JP); Naomasa Yoshida, Nagano (JP); Masayuki Kodani, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 144 days.

(21) Appl. No.: 17/579,707

(22) Filed: Jan. 20, 2022

(65) Prior Publication Data

US 2022/0271611 A1 Aug. 25, 2022

(30) Foreign Application Priority Data

Feb. 25, 2021 (JP) ................. 2021-028774

(51) Int. Cl.
*H02K 5/22* (2006.01)
*H02K 3/04* (2006.01)
*H02K 11/30* (2016.01)

(52) U.S. Cl.
CPC .............. *H02K 5/225* (2013.01); *H02K 3/04* (2013.01); *H02K 11/30* (2016.01); *H02K 2203/03* (2013.01); *H02K 2203/09* (2013.01)

(58) Field of Classification Search
CPC .......... H02K 5/225; H02K 3/04; H02K 11/30; H02K 2203/03; H02K 2203/09; H02K 11/33; H02K 11/0094; H02K 3/50; H02K 3/522; H02K 11/40; H01R 4/66
USPC ........................................... 310/51, 68 R, 71
See application file for complete search history.

(56) References Cited

U.S. PATENT DOCUMENTS

| | | | |
|---|---|---|---|
| 6,528,913 B1 * | 3/2003 | Michaels ................. | H02K 3/50 336/107 |
| 7,151,333 B2 * | 12/2006 | Suzuki .................. | H02K 11/40 310/71 |
| 10,253,736 B2 * | 4/2019 | Honda .................... | F04D 3/005 |
| 2014/0361650 A1 * | 12/2014 | Schneider .............. | H02K 11/40 310/71 |
| 2015/0091401 A1 * | 4/2015 | Buerger ................. | H02K 5/225 310/71 |
| 2015/0333596 A1 * | 11/2015 | Berkouk .............. | H05K 3/4015 310/71 |
| 2022/0271611 A1 * | 8/2022 | Hirachi ................. | H02K 5/225 |

FOREIGN PATENT DOCUMENTS

JP 2014-017929 A 1/2014

* cited by examiner

*Primary Examiner* — John K Kim
(74) *Attorney, Agent, or Firm* — Oliff PLC

(57) ABSTRACT

A motor device includes a motor body, a case that houses the motor body, a printed circuit board that controls the drive of the motor body and is supported by the case, and a ground bus bar that is arranged between the motor body and the printed circuit board and connects the motor body and ground of the printed circuit board.

9 Claims, 10 Drawing Sheets

MOTOR DEVICE WITH GROUND BUS BAR

CROSS-REFERENCE TO RELATED APPLICATION

This application is based upon and claims the benefit of priority of the prior Japanese Patent Application No. 2021-028774, filed on Feb. 25, 2021, the entire contents of which are incorporated herein by reference.

BACKGROUND

(i) Technical Field

The present disclosure relates to a motor device.

(ii) Related Art

A method of electrically connecting a motor body and ground of a printed circuit board has been proposed (see, for example, Japanese Unexamined Patent Application Publication No. 2014-017929).

SUMMARY

According to an aspect of the present disclosure, there is provided a motor device including: a motor body; a case that houses the motor body; a printed circuit board that controls the drive of the motor body and is supported by the case; and a ground bus bar that is arranged between the motor body and the printed circuit board and connects the motor body and ground of the printed circuit board, wherein the ground bus bar is an elastic metal plate-shaped rod, the ground bus bar includes: a first connected portion fixed to the motor body; a second connected portion fixed to the printed circuit board; and an extending portion extending from the first connected portion to the second connected portion, the printed circuit board includes a through hole for ground connection, the first connected portion is screwed to the motor body, and the second connected portion is inserted into the through hole and is elastically deformed to be engaged with the through hole.

DETAILED DESCRIPTION

Figure 1:
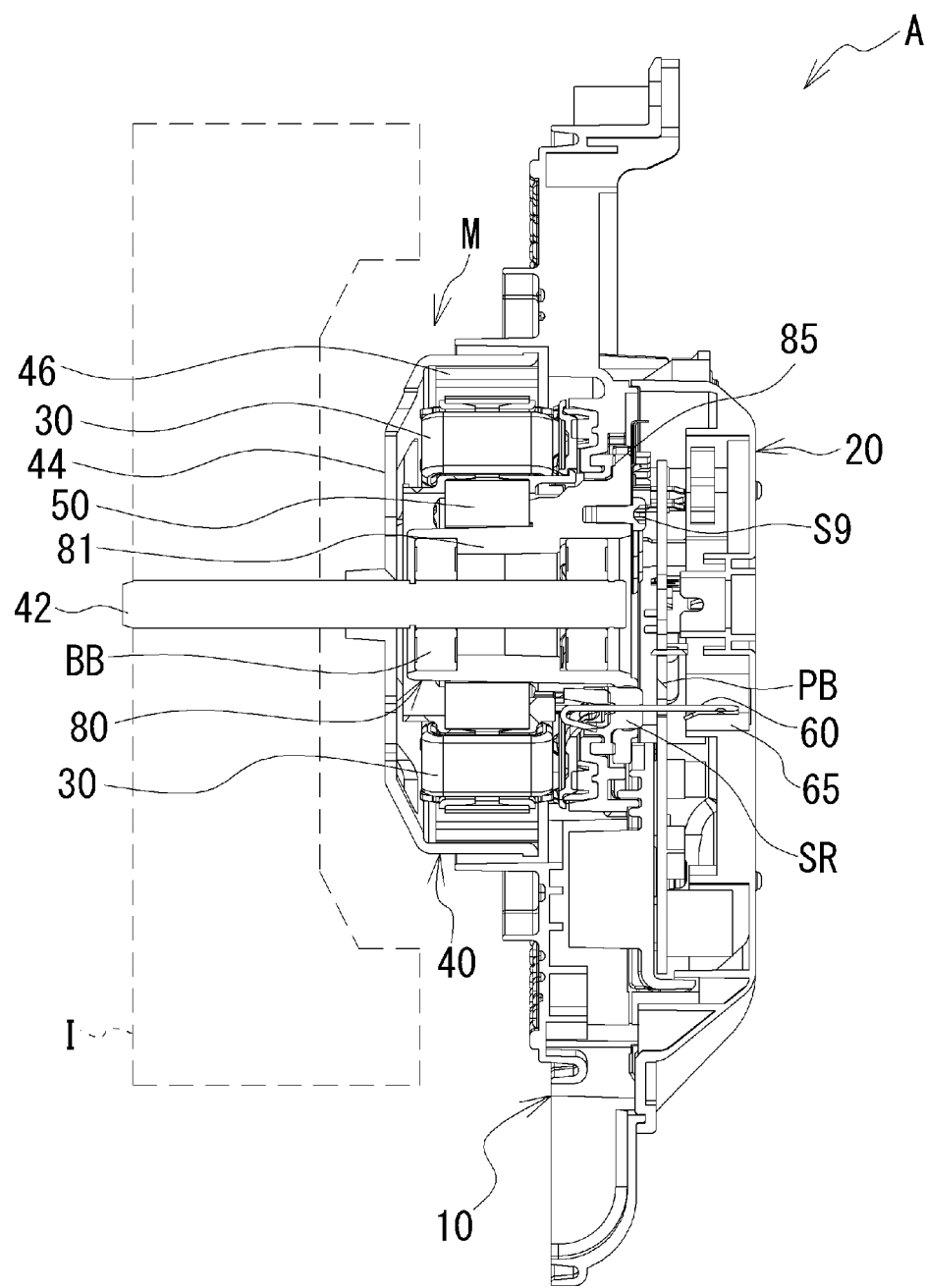
FIG. 1 is a cross-sectional view of a blower device according to a present embodiment.

FIG. 1 is a cross-sectional view of the blower device A according to the present embodiment. FIG. 1 illustrates a cross section including a central axis of the rotary shaft 42, which will be described later. The blower device A includes cases 10 and 20, a motor M, a fan I rotated by the motor M, and a printed circuit board PB electrically connected to the motor M. The fan I is illustrated briefly in FIG. 1. The motor M and the fan I are located on one side of the case 10, and the case 20 is attached to the other side of the case 10. The cases 10 and 20 are each formed in a semi-case shape, and are assembled with each other so as to house the printed circuit board PB in the cases 10 and 20. The cases 10 and 20 are made of synthetic resin, but the cases are not limited to these, and may be made of metal.

The motor M will be explained. The motor M is located between the fan I and the case 10. The motor M includes coils 30, a rotor 40, a stator 50, terminals 60, and a housing 80. The stator 50 is made of metal and will be described in detail later. The coil 30 is wound around each tooth portion of the stator 50. The coils 30 are electrically connected to the printed circuit board PB via the terminals 60 which are non-conductively supported by the stator 50. Components for controlling the energized state of the coils 30 are mounted on the printed circuit board PB.

The rotor 40 includes a rotary shaft 42, a yoke 44, and one or more permanent magnets 46. The rotary shaft 42 is rotatably supported and penetrates through the housing 80. Specifically, the rotary shaft 42 is rotatably supported by a bearing BB held in the housing 80. The yoke 44 is fixed to the rotary shaft 42 on the outside of the housing 80, is substantially cylindrical, and is made of metal. The housing 80 includes a cylindrical portion 81 formed into a substantially cylindrical shape, and a flange portion 85 formed into a disk shape at the end of the cylindrical portion 81 on the printed circuit board PB side. An outer diameter of the flange portion 85 is greater than an outer diameter of the cylindrical portion 81. The terminal 60 penetrates through the flange portion 85 via a rubber seal portion SR. Further, the terminal 60 penetrates through an escape hole provided in the printed circuit board PB and is electrically connected to the printed circuit board PB via the conductive member 65. One or more permanent magnets 46 are fixed to the inner peripheral side surface of the yoke 44. The permanent magnet 46 faces the outside of the tooth portions of the stator 50. When the coil 30 is energized, the tooth portions of the stator 50 are excited, whereby magnetic attraction force and magnetic repulsive force act between the permanent magnet 46 and the teeth portions, and the yoke 44, that is, the rotor 40 rotates relative to the stator 50. As described above, the motor M is an outer rotor type motor in which the rotor 40 rotates.

Figure 2:
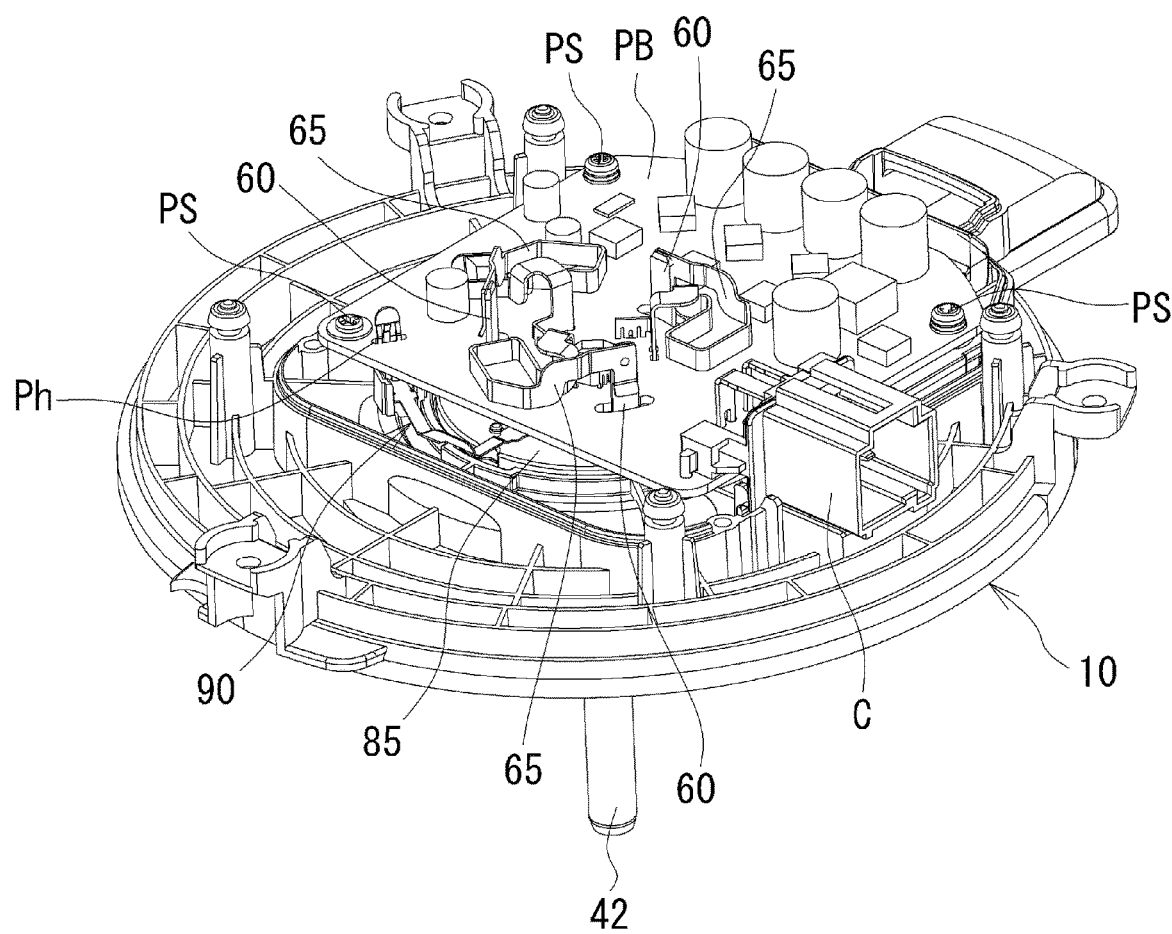
FIG. 2 is a perspective view of a periphery of a printed circuit board with a case removed.

FIG. 2 is a perspective view of a periphery of the printed circuit board PB with the case 20 removed. The printed circuit board PB is fixed to the case 10 with screws PS at a predetermined distance from the flange portion 85. The terminal 60 penetrates through the escape hole of the printed circuit board PB, and an end of the conductive member 65 is welded to an end of the terminal 60. The other end of the conductive member 65 is conductively connected to a conductive pattern of the printed circuit board PB. Further, the connector C is mounted on the printed circuit board PB. A ground bus bar 90 is arranged between the case 10 and the printed circuit board PB, specifically, between the flange portion 85 and the printed circuit board PB.

Figure 3:
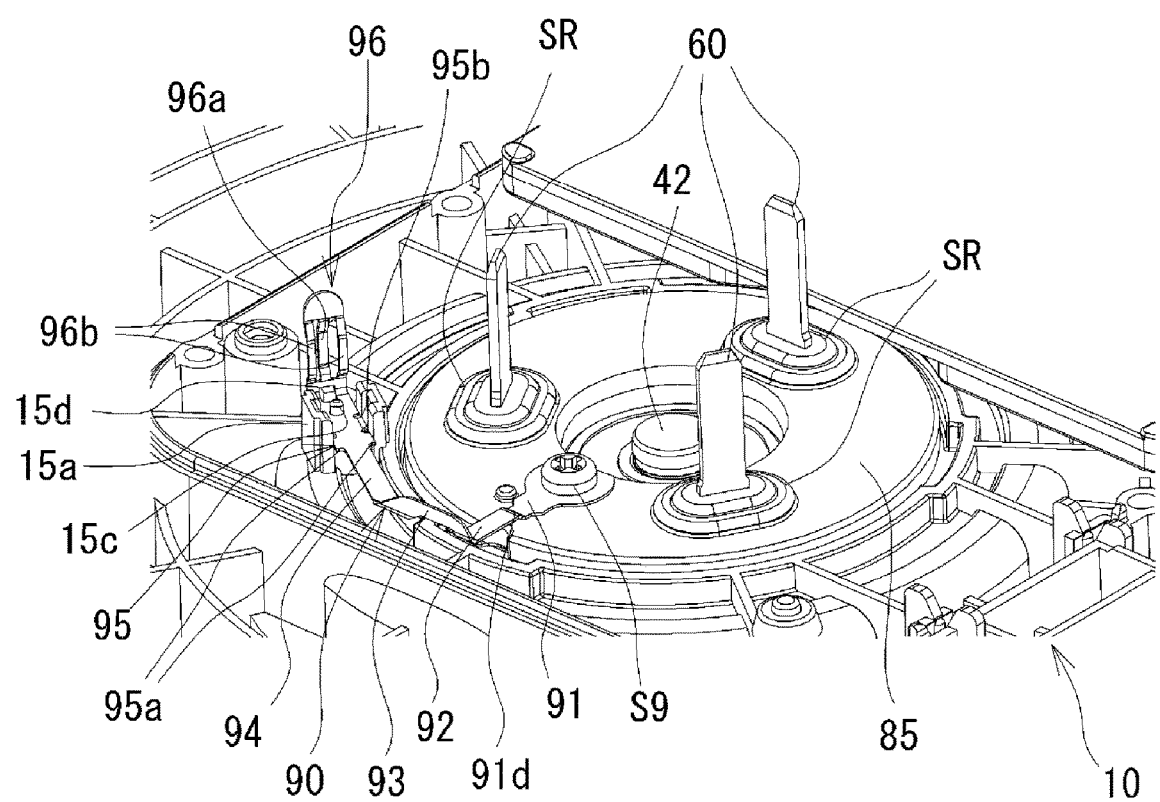
FIG. 3 is a perspective view of a periphery of a ground bus bar with the printed circuit board removed.

FIG. 3 is a perspective view of a periphery of the ground bus bar 90 with the printed circuit board PB removed. An end of the ground bus bar 90 is conductively fixed to a bottom surface of the flange portion 85 by a screw S9. As illustrated in FIG. 2, the other end of the ground bus bar 90 is inserted into a through hole Ph of the printed circuit board PB and is electrically connected to the ground of the printed circuit board PB. The ground bus bar 90 is an elastic metal plate-shaped rod body, which is formed by pressing a metal plate, and is formed into a predetermined thickness so as to be elastically deformed.

Figure 4A:
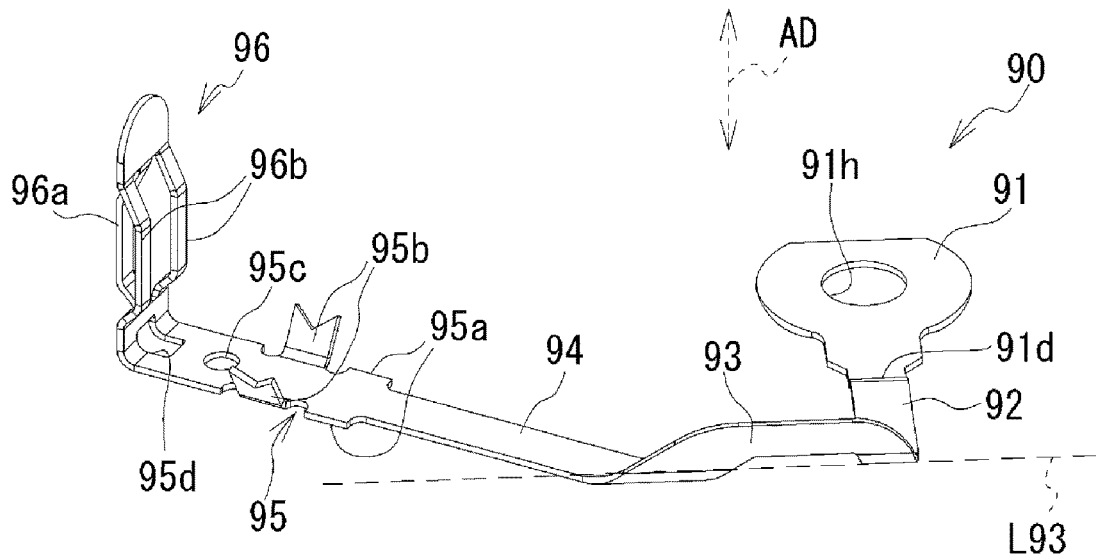
FIGS. 4A and 4B are explanatory views of the ground bus bar.
Figure 4B:
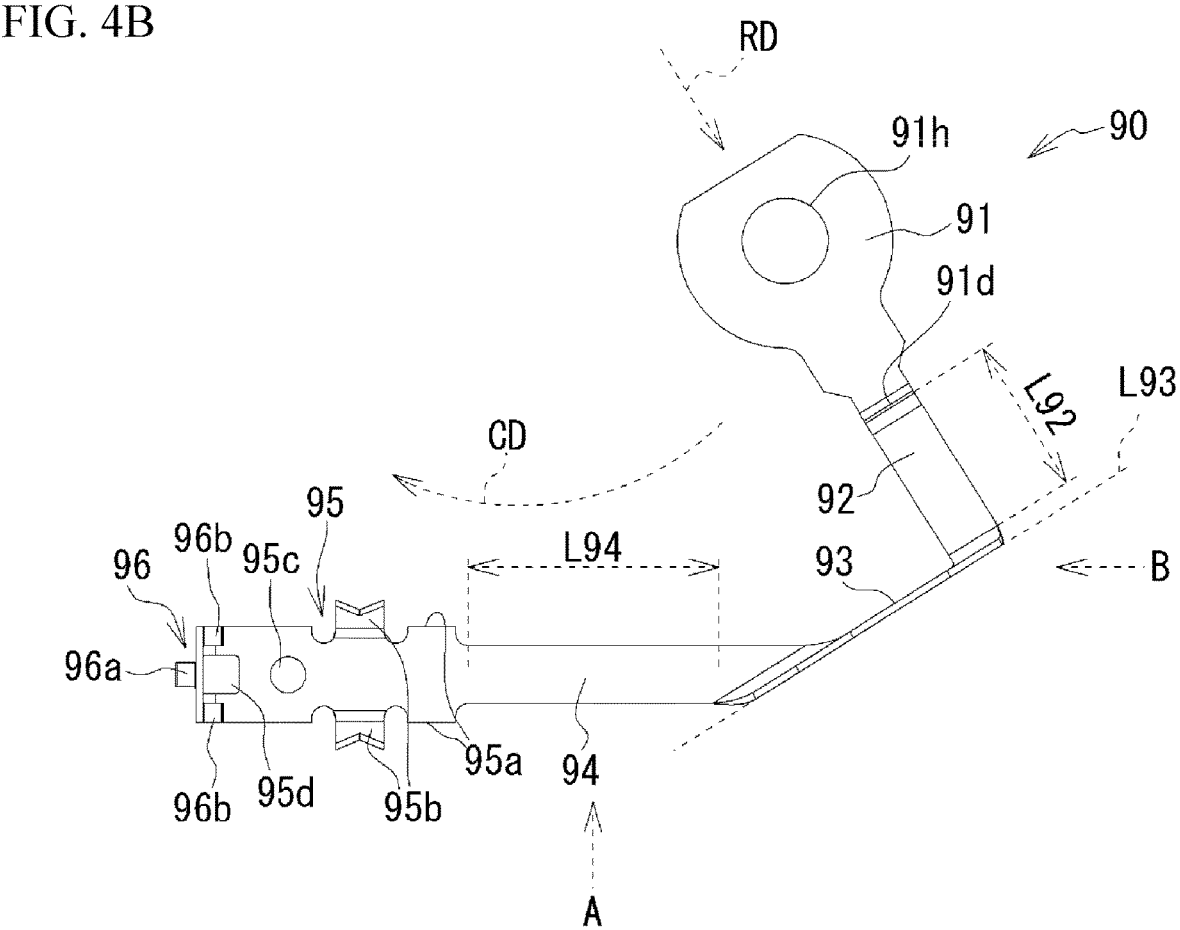
Figure 5A:
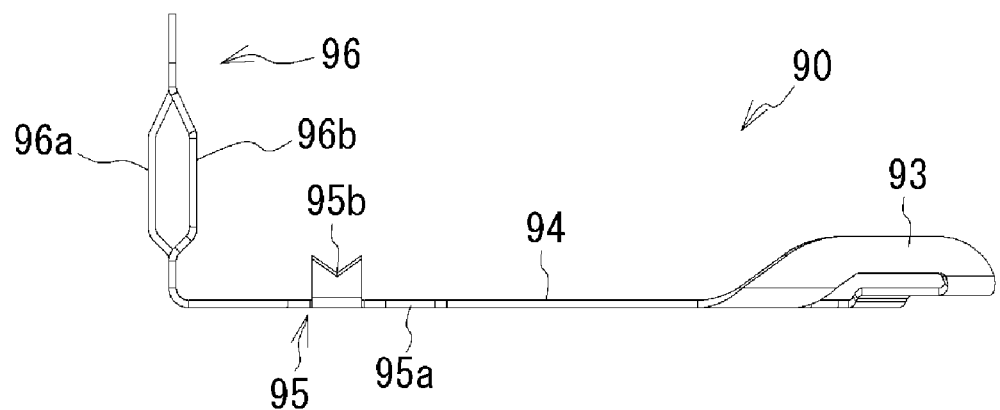
FIGS. 5A and 5B are explanatory views of the ground bus bar.
Figure 5B:
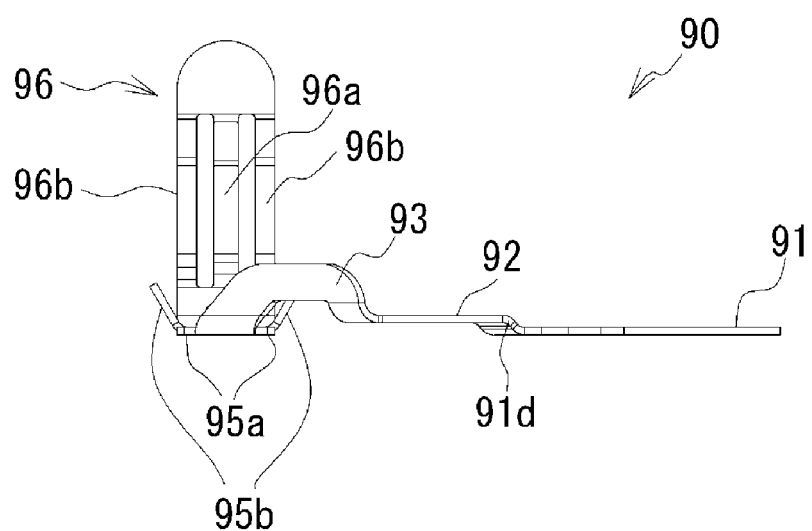

FIGS. 4A to 5B are explanatory views of the ground bus bar 90. Note that FIG. 5A illustrates the ground bus bar 90 seen in the direction of arrow A in FIG. 4B, and FIG. 5B illustrates the ground bus bar 90 seen in the direction of arrow B in FIG. 4B. The ground bus bar 90 includes a first connected portion 91, a first continuous portion 92, a bent portion 93, a second continuous portion 94, a held portion 95, and a second connected portion 96. The first continuous portion 92, the bent portion 93, the second continuous portion 94, and the held portion 95 correspond to an extending portion.

The first connected portion 91 has a thin disk shape. A hole 91h through which the screw S9 penetrates is formed in the center of the first connected portion 91. The first continuous portion 92 has a linear shape extending from the first connected portion 91 in a predetermined direction with a constant width. As illustrated in FIG. 5B, a step portion 91d is formed at the boundary between the first connected portion 91 and the first continuous portion 92, so that the first continuous portion 92 is slightly higher than the first connected portion 91.

The bent portion 93 is continuous from the first continuous portion 92 in a different direction, and is bent at approximately 90 degrees with respect to the first continuous portion 92 and the second continuous portion 94. FIGS. 4A and 4B illustrates a bending line L93 of the bent portion 93. The bending line L93 is located on the boundary line between the first continuous portion 92 and the bent portion 93 and on the boundary line between the second continuous portion 94 and the bent portion 93. The second continuous portion 94 extends linearly from the bent portion 93 in a different direction.

The held portion 95 extends linearly from the second continuous portion 94 in the same direction with a constant width. The held portion 95 is provided with protruding edges 95a, engaging pieces 95b, a fitting hole 95c, and an engaging hole 95d in this order from the second continuous portion 94. The two protruding edges 95a project slightly outward from the edges on both sides of the held portion 95 and extend parallel to the longitudinal direction of the held portion 95. The two engaging pieces 95b extend obliquely upward from the edges on both sides of the held portion 95. Specifically, the two engaging pieces 95b extend obliquely upward so that their ends are spaced away from each other as compared with their root portions. The end of the engaging piece 95b is formed into a valley shape, but is not limited thereto. The fitting hole 95c has a circular shape, but is not limited thereto. The engaging hole 95d has a rectangular shape, but is not limited thereto. The second connected portion 96 is bent upward from the held portion 95 and extends linearly. The engaging hole 95d is formed at the boundary between the held portion 95 and the second connected portion 96.

As illustrated in FIG. 3, the protruding edges 95a and the engaging pieces 95b are engaged with a concave portion 15a provided in the vicinity of the flange portion 85 of the case 10. The concave portion 15a has two facing wall portions, and the protruding edges 95a and the engaging pieces 95b are engaged between the two wall portions. Specifically, the protruding edge 95a is in contact with the vicinity of a root portion of the inner surface of one of the two facing wall portions of the concave portion 15a. A recessed portion with which the end of the engaging piece 95b engages is formed on the inner surface side of the concave portion 15a. Specifically, the engaging pieces 95b are housed in the concave portion 15a in a state of being elastically deformed by the two wall portions of the concave portion 15a so that the ends of the two engaging pieces 95b are close to each other. The two engaging pieces 95b push the two wall portions of the concave portion 15a so as to be separated from each other by their elastic restoring force. As a result, the engaging pieces 95b are held so as not to fall off from the concave portion 15a.

A fitting projection 15c having a columnar shape and provided in the vicinity of the concave portion 15a of the case 10 is fitted in the fitting hole 95c. Further, an engaging protrusion 15d having a rectangular parallelepiped shape and provided in the vicinity of the fitting protrusion 15c of the case 10 is engaged with the engaging hole 95d. In such a way, the held portion 95 is fixed to the case 10 and suppresses the displacement of the ground bus bar 90 with respect to the case 10.

The second connected portion 96, corresponding to a so-called press fit, includes a bulging portion 96a and two bulging portions 96b that sandwich the bulging portion 96a in the width direction. The bulging portion 96a protrudes to one side of the second connected portion 96 in the thickness direction, and the bulging portion 96b protrudes to the opposite side of the second connected portion 96 in the thickness direction. The bulging portion 96a is elastically deformable in the direction opposite to the direction in which the bulging portion 96a protrudes. Likewise, the bulging portion 96b is elastically deformable in the direction opposite to the direction in which the bulging portion 96b protrudes. There is a gap in the width direction of the second connected portion 96 between the bulging portion 96a and one of the two bulging portions 96b. There is also a gap between the bulging portion 96a and the other of the bulging portion 96b. That is, the total width of the bulging portion 96a and the two bulging portions 96b is smaller than the width of the entire second connected portion 96. That is, each width of the bulging portions 96a and 96b is small. As a result, the bulging portions 96a and 96b are easily deformed elastically. The end of the second connected portion 96 has a semicircular thin plate shape.

Figure 6:
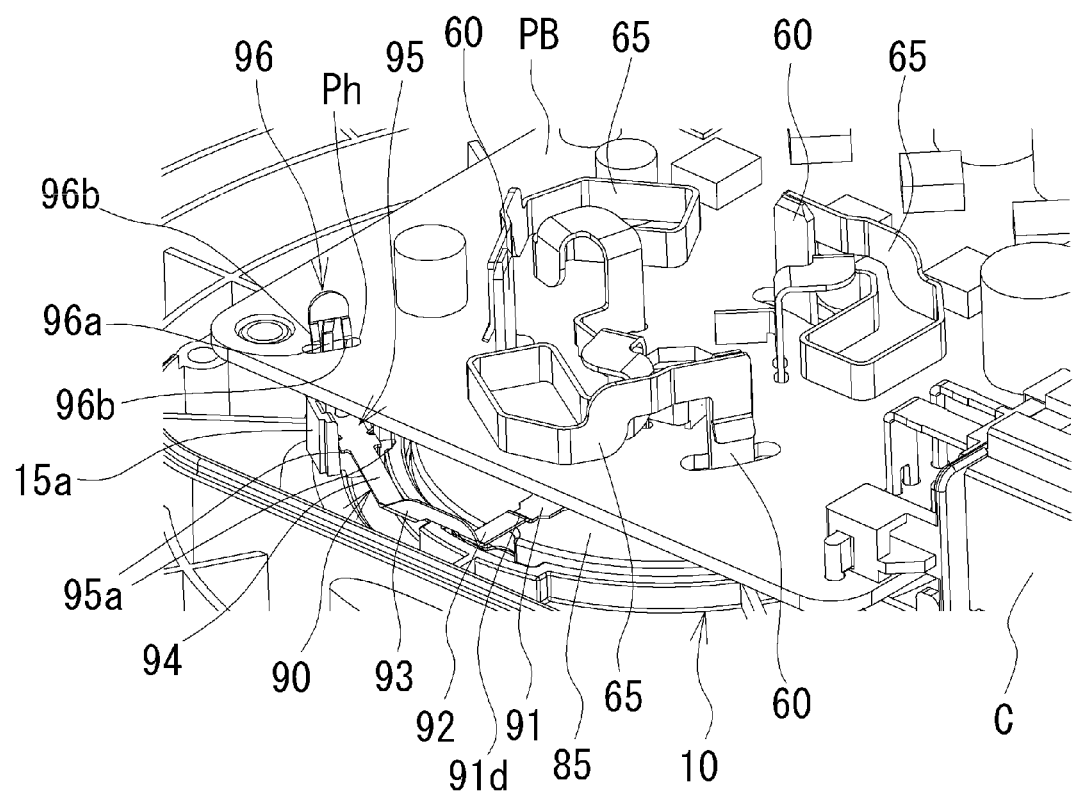
FIG. 6 is an explanatory view of assembling work of the ground bus bar and the printed circuit board.
Figure 7:
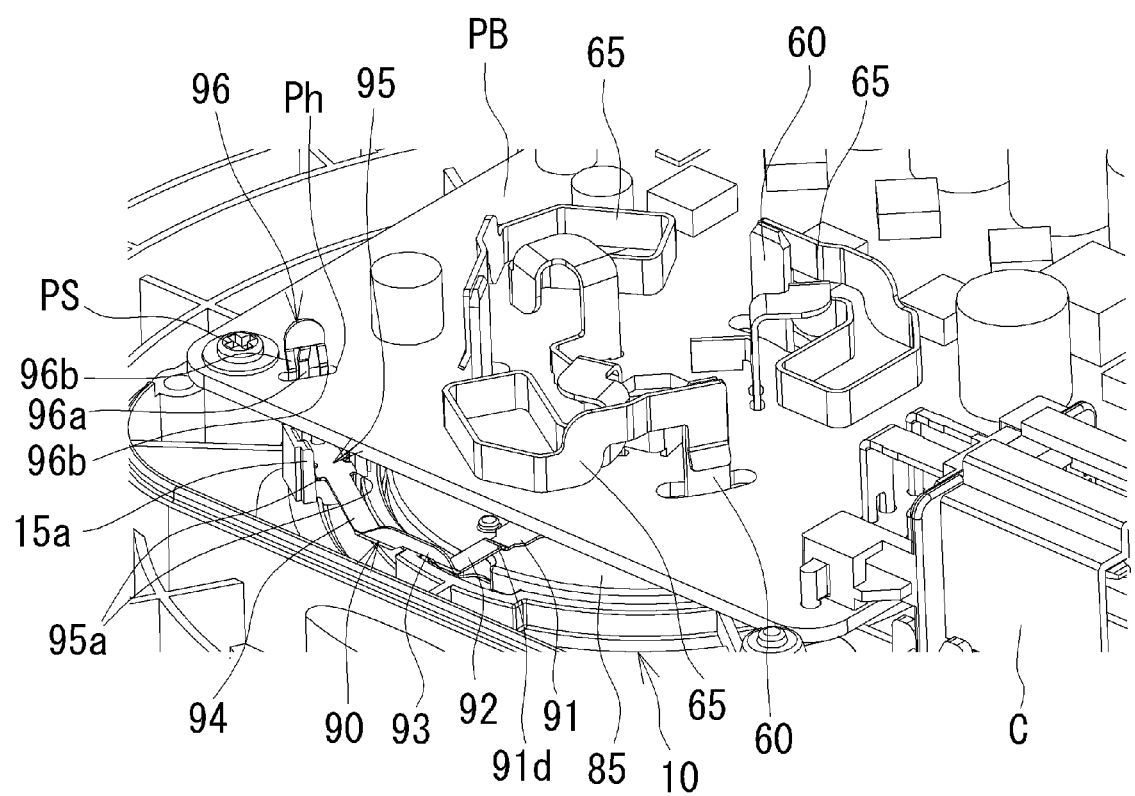
FIG. 7 is an explanatory view of the assembling work of the ground bus bar and the printed circuit board.
Figure 8:
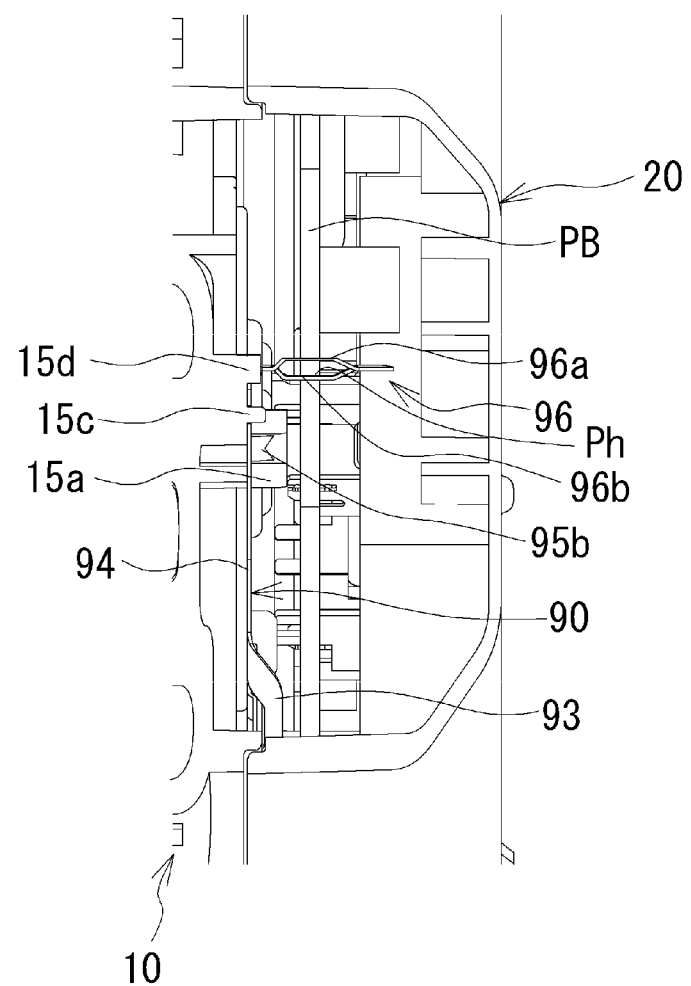
FIG. 8 is an explanatory view of the assembling work of the ground bus bar and the printed circuit board.

Next, the work of assembling the ground bus bar 90 and the printed circuit board PB will be described. FIGS. 6 to 8 are explanatory views of the assembling work of the ground bus bar 90 and the printed circuit board PB. First, as illustrated in FIG. 3, the fitting hole 95c and the engaging hole 95d are respectively inserted into the fitting protrusion 15c and the engaging protrusion 15d, while the protruding edge 95a and the engaging piece 95b of the ground bus bar 90 are inserted into and held between the two wall portions of the concave portion 15a. In order to hold the held portion 95 of the ground bus bar 90 in the case 10 in this way, special jig or the like is not required. This improves the assembling workability.

Next, the first connected portion 91 is fixed to the flange portion 85 with the screw S9. Next, the terminals 60 are respectively inserted into the through holes of the printed circuit board PB, the second connected portion 96 is inserted into the through hole Ph of the printed circuit board PB, so that the printed circuit board PB is placed above the ground bus bar 90. Herein, the bulging portions 96a and 96b of the second connected portion 96 push the inner surface of the through hole Ph by the elastic restoring force. Accordingly, the bulging portions 96a and 96b are electrically connected to the grand exposed to the inner surface of the through hole Ph. In such a way, even when the second connected portion 96 and the ground of the printed circuit board PB are conductively connected, a fixing member such as a screw is not required, which improves the assembling workability.

Next, a confirmation test of the electrical connection between the printed circuit board PB and the ground bus bar 90 is performed. When there is no problem, an end of the conduction member 65 having the other end having already attached to the printed circuit board PB is welded to the end of the terminal 60 as illustrated in FIG. 6. Next, a confirmation test of the electrical connection between the printed circuit board PB and the conductive members 65 is performed. When there is no problem, the printed circuit board PB is fixed to the case 10 with the screw PS as illustrated in FIG. 7. After that, the case 20 is assembled to the case 10. FIG. 8 is a cross-sectional view illustrating the periphery of the ground bus bar 90 and the printed circuit board PB after the case 20 is assembled to the case 10.

For example, in the confirmation test of the electrical connection between the second connected portion 96 and the ground of the printed circuit board PB, when there is any abnormality in the printed circuit board PB, the printed circuit board PB is easily removed from the ground bus bar 90. In this way, the workability of replacing the printed circuit board PB is also improved.

Next, vibration absorption of the ground bus bar 90 will be described. In the blower device A, the vibration of the motor M is also transmitted to the ground bus bar 90. Herein, the vibration of the motor M mainly includes the vibration in the direction of the central axis of the rotary shaft 42 and the vibration in the circumferential direction about the central axis of the rotary shaft 42. For example, as illustrated in FIG. 4A, when the flange portion 85 vibrates in the axial direction AD of the rotary shaft 42, the first connected portion 91 is fixed to the flange portion 85, so that the vibration in the axial direction AD might be transmitted from the first connected portion 91 to the second connected portion 96. This might affect the electrical connection between the second connected portion 96 and the through hole Ph.

However, in the present embodiment, the bending line L93 of the bent portion 93 intersects a radial direction RD about the central axis of the rotary shaft 42 as illustrated in FIG. 4B, specifically, the bending line L93 is substantially orthogonal to the radial direction RD. Therefore, the vibration of the first connected portion 91 in the axial direction AD is absorbed by elastic deformation of the first continuous portion 92 with respect to the bent portion 93 about the bending line L93, and by elastic deformation of the bent portion 93 with respect to the second continuous portion 94 about the bending line L93. This suppresses the vibration from being transmitted to the second connected portion 96.

As illustrated in FIG. 4B, a length L94 of the second continuous portion 94 is formed longer than a length L92 of the first continuous portion 92, and the thickness and width of the second continuous portion 94 and the first continuous portion 92 are the same. Therefore, the second continuous portion 94 is more easily bent than the first continuous portion 92. Further, the second continuous portion 94 is along the circumferential direction CD about the central axis of the rotary shaft 42. Therefore, in the second continuous portion 94, the vibration in the circumferential direction CD is absorbed by slight bend of the second continuous portion 94.

Further, even if the vibration of the motor M is transmitted to the first connected portion 91, the first continuous portion 92, the bent portion 93, and the second continuous portion 94 in this order, the held portion 95 is held by the case 10. Therefore, the held portion 95 is suppressed from rattling with respect to the case 10. Herein, as illustrated in FIG. 4B, the held portion 95 is closer to the second connected portion 96 than to the first connected portion 91. Therefore, since the held portion 95 is held by the case 10 at a position close to the second connected portion 96, it is possible to suppress the second connected portion 96 from rattling with respect to the case 10. As a result, it is possible to suppress the second connected portion 96 from rattling with respect to the through hole Ph of the printed circuit board PB fixed to the case 10. Thus, the electrical connection between the second connected portion 96 and the printed circuit board PB is ensured.

Figure 9:
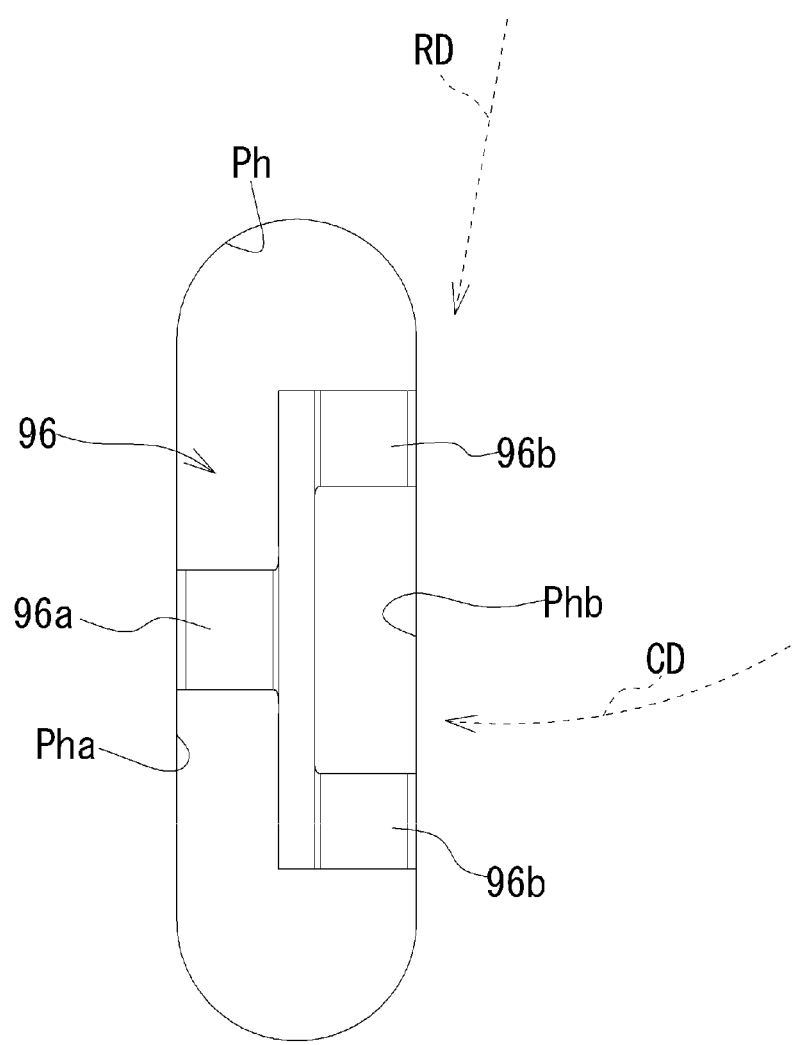
FIG. 9 is an enlarged view of a through hole into which a second connected portion is inserted.

FIG. 9 is an enlarged view of the through hole Ph into which the second connected portion 96 is inserted. The through hole Ph has an elongated hole shape extending along the radial direction RD, and has linear-shaped long edges Pha and Phb facing each other. In other words, the long edges Pha and Phb extend so as to intersect the circumferential direction CD. The bulging portions 96a and 96b push the long edges Pha and Phb, respectively. For example, even when the vibration of the circumferential direction CD is transmitted to the second connected portion 96, the bulging portions 96a and 96b is elastically deformed in the circumferential direction CD so as to always push and follow the long edges Pha and Phb. This ensures the electrical connection between the second connected portion 96 and the printed circuit board PB.

As illustrated in FIG. 9, the two bulging portions 96b are provided so as to sandwich the bulging portion 96a from the longitudinal direction of the through hole Ph. In such a way, the second connected portion 96 is connected to the inner surface of the through hole Ph at three points in total. This ensures the electrical connection between the second connected portion 96 and the printed circuit board PB.

Further, as illustrated in FIG. 9, the long edges Pha and Phb each has a linear shape, and the bulging portions 96a and 96b are in surface contact with the long edges Pha and Phb, respectively. Therefore, for example, even if the vibration in the radial direction RD is transmitted to the second connected portion 96 and the second connected portion 96 is displaced in the through hole Ph in the longitudinal direction thereof, the above-mentioned surface contact is maintained. This ensures the electrical connection between the second connected portion 96 and the printed circuit board PB.

Figure 10:
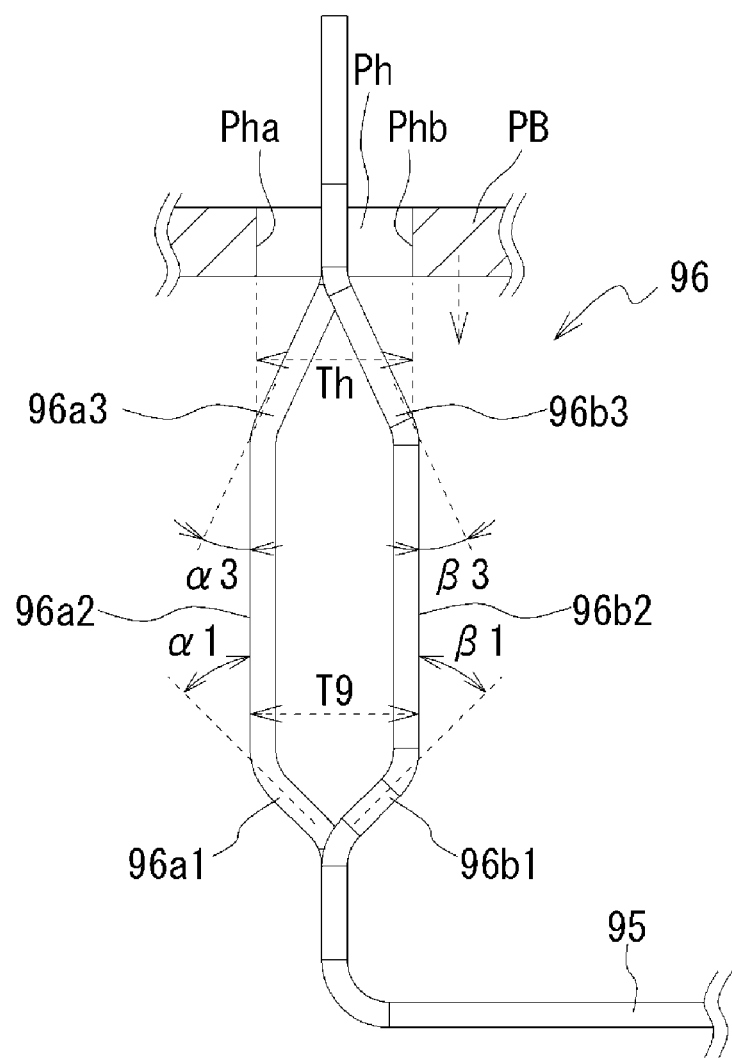
FIG. 10 is an enlarged view of the second connected portion.

FIG. 10 is an enlarged view of the second connected portion 96. FIG. 10 illustrates the printed circuit board PB in the process of inserting the second connected portion 96 into the through hole Ph. The bulging portion 96a has a root inclined portion 96a1, a flat portion 96a2, and an end inclined portion 96a3 in this order from the held portion 95. Similarly, the bulging portion 96b has a root inclined portion 96b1, a flat portion 96b2, and an end inclined portion 96b3 in this order from the held portion 95. The root inclined portions 96a1 and 96b1 are inclined in opposite directions from the held portion 95. The flat portions 96a2 and 96b2 extend parallel to each other. The end inclined portions 96a3 and 96b3 are inclined so as to approach each other from the flat portions 96a2 and 96b2, respectively. As illustrated in FIG. 10, before the printed circuit board PB is assembled to the ground bus bar 90, a distance T9 in the thickness direction of the flat portions 96a2 and 96b2 is longer than the length Th in the lateral direction of the through hole Ph. Therefore, the bulging portions 96a and 96b are inserted into the through holes Ph, and the elastic restoring force of the bulging portions 96a and 96b is applied to the long edge Pha and Phb in a state where the flat portions 96a2 and 96b2 are in contact with the long edge Pha and Phb, respectively. Thus, the flat portions 96a2 and 96b2 push the long edges Pha and Phb, respectively.

Further, as illustrated in FIG. 10, an angle α3 of the end inclined portion 96a3 with respect to the flat portion 96a2 is smaller than an angle α1 of the root inclined portion 96a1 with respect to the flat portion 96a2, and an angle β3 of the end inclined portion 96b3 with respect to the flat portion 96b2 is smaller than the angle β1 of the root inclined portion 96b1 with respect to the flat portion 96b2. Therefore, when the second connected portion 96 is inserted into the through hole Ph, elastic deformation is easy so that the end inclined portions 96a3 and 96b3 come into contact with the long edges Ph and Phb and are compressed, respectively. This improves the assembly workability.

In the above embodiment, the motor device incorporated in the blower device A has been described as an example, but the present disclosure is not limited to such a motor device. The motor device may be, for example, incorporated in a pump device, or a motor device alone. Further, in the above embodiment, the outer rotor type motor has been described as an example, but the present disclosure is not limited to this, and an inner rotor type motor may be used.

While the exemplary embodiments of the present disclosure have been illustrated in detail, the present disclosure is not limited to the above-mentioned embodiments, and other embodiments, variations and variations may be made without departing from the scope of the present disclosure.

What is claimed is:

1. A motor device comprises:
a motor body;
a case that houses the motor body;
a printed circuit board that controls the drive of the motor body and is supported by the case; and
a ground bus bar that is arranged between the motor body and the printed circuit board and connects the motor body and ground of the printed circuit board,
wherein
the ground bus bar is an elastic metal plate-shaped rod,
the ground bus bar includes:
  a first connected portion fixed to the motor body;
  a second connected portion fixed to the printed circuit board; and
  an extending portion extending from the first connected portion to the second connected portion,
the printed circuit board includes a through hole for ground connection,
the first connected portion is screwed to the motor body, and
the second connected portion is inserted into the through hole and is elastically deformed to be engaged with the through hole.

2. The motor device according to claim 1, wherein
the second connected portion includes a first bulging portion and a second bulging portion,
the first bulging portion and the second bulging portion are elastically deformable and bulge in opposite directions,
the through hole is formed into an elongated hole shape,
the through hole includes a first long edge and a second long edge,
the first long edge and the second long edge extend in a longitudinal direction of the through hole and face each other, and
the first bulging portion and the second bulging portion push the first long edge and the second long edge, respectively, according to elastic restoring force of the first bulging portion and the second bulging portion.

3. The motor device according to claim 2, wherein two of the second bulging portions sandwich the first bulging portion in the longitudinal direction.

4. The motor device according to claim 2, wherein
the first long edge and the second long edge extend in a radial direction of a central axis of the motor body, and
the first bulging portion and the second bulging portion are elastically deformable in a circumferential direction about the central axis of the motor body.

5. The motor device according to claim 1, wherein
the extending portion includes a held portion, and
the held portion is located between the first connected portion and the second connected portion, and is held by the case.

6. The motor device according to claim 5, wherein
the held portion includes a first engaging piece and a second engaging piece,
the first engaging piece and the second engaging piece are elastically deformable,
the case includes a concave portion including two wall portions facing each other, and
the held portion is held in a state where the first engaging piece and the second engaging piece are elastically deformed between the two wall portions.

7. The motor device according to claim 5, wherein the held portion is closer to the second connected portion than to the first connected portion.

8. The motor device according to claim 5, wherein
the extending portion includes:
  a first continuous portion extending from the first connected portion in the radial direction of the motor body;
  a second continuous portion extending to an opposite side of the second connected portion and extending from the held portion in the circumferential direction of the motor body; and
  a bent portion continuous between the first continuous portion and the second continuous portion,
the first continuous portion, the second continuous portion, and the bent portion are not fixed to the motor body or the case,
the bent portion is bent so as to stand up with respect to the first continuous portion and the second continuous portion, and
a boundary line between the bent portion and the first continuous portion, and a boundary line between the bent portion and the second continuous portion intersect the radial direction about the central axis of the motor body.

9. The motor device according to claim 8, wherein
the first continuous portion extends in the radial direction about the central axis of the motor body,
the second continuous portion extends in the circumferential direction of the central axis of the motor body, and
a length of the second continuous portion in a direction in which the second continuous portion extends is greater than a length of the first continuous portion in a direction in which the first continuous portion extends.

* * * * *